(12) United States Patent
Stevens et al.

(10) Patent No.: US 8,924,570 B2
(45) Date of Patent: Dec. 30, 2014

(54) TEMPORARY COLLABORATIVE AD-HOC NETWORK OF HARDWARE NODES TO PERFORM FUNCTION

(75) Inventors: Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 12/953,222

(22) Filed: Nov. 23, 2010

(65) Prior Publication Data
US 2012/0131226 A1 May 24, 2012

(51) Int. Cl.
G06F 15/16 (2006.01)
H04W 84/18 (2009.01)

(52) U.S. Cl.
CPC .................................. *H04W 84/18* (2013.01)
USPC ....................................................... 709/227

(58) Field of Classification Search
USPC ....................................................... 709/227
See application file for complete search history.

(56) References Cited

U.S. PATENT DOCUMENTS

| | | | |
|---|---|---|---|
| 6,192,401 B1 | 2/2001 | Modiri et al. | |
| 7,039,694 B2 * | 5/2006 | Kampe et al. | 709/222 |
| 7,339,484 B2 * | 3/2008 | Pradhan et al. | 340/635 |
| 7,460,508 B2 * | 12/2008 | Dssouli et al. | 370/338 |
| 7,492,777 B2 * | 2/2009 | Ekberg et al. | 370/401 |
| 7,590,097 B2 * | 9/2009 | Ekberg et al. | 370/338 |
| 7,599,305 B2 * | 10/2009 | Bui | 370/252 |
| 7,613,458 B2 * | 11/2009 | Roberts | 455/445 |
| 7,668,958 B2 * | 2/2010 | Burr | 709/227 |
| 7,685,288 B2 * | 3/2010 | Kakivaya et al. | 709/227 |
| 7,697,490 B2 * | 4/2010 | Dssouli et al. | 370/338 |
| 7,831,738 B2 * | 11/2010 | Rofougaran | 709/250 |
| 7,907,954 B2 * | 3/2011 | Poyhonen et al. | 455/454 |
| 8,068,813 B2 * | 11/2011 | Shimosato | 455/412.1 |
| 8,090,879 B2 * | 1/2012 | Rofougaran | 709/250 |
| 8,126,982 B2 * | 2/2012 | Nidd | 709/217 |
| 8,155,044 B2 * | 4/2012 | Yim et al. | 370/312 |
| 8,169,303 B2 * | 5/2012 | Hanebeck | 340/10.51 |
| 8,203,435 B2 * | 6/2012 | Hanebeck | 340/10.5 |
| 8,207,828 B2 * | 6/2012 | Hanebeck | 340/10.51 |
| 2002/0044549 A1 * | 4/2002 | Johansson et al. | 370/386 |
| 2003/0081603 A1 * | 5/2003 | Rune | 370/390 |
| 2003/0105820 A1 * | 6/2003 | Haims et al. | 709/205 |
| 2003/0167340 A1 * | 9/2003 | Jonsson | 709/238 |
| 2004/0203381 A1 * | 10/2004 | Cahn et al. | 455/41.2 |

(Continued)

OTHER PUBLICATIONS

Lionel Barrère et al, "A Totally Decentralized Document Sharing System for Mobile Ad Hoc Networks" Proceedings of the 4th ACM international workshop on Mobility management and wireless access, pp. 116-120, Year of Publication: 2006, Publisher: ACM.

*Primary Examiner* — Alicia Baturay
(74) *Attorney, Agent, or Firm* — Damion Josephs (57) ABSTRACT

That a trigger for creating a temporary collaborative ad-hoc network of hardware nodes has occurred is detected. In response, the temporary collaborative ad-hoc network is created via intercommunication among the hardware nodes. After the temporary collaborative ad-hoc network has been created, the temporary collaborative ad-hoc network performs a given function. A particular hardware node within the temporary collaborative ad-hoc network can perform a roll call request so that it ascertains a list of the hardware nodes within the temporary collaborative ad-hoc network. Performing the roll call request can include ascertaining that a correctness of the list of the hardware nodes satisfies a threshold, such that the correctness of the list of the hardware nodes is not necessarily completely correct.

8 Claims, 5 Drawing Sheets

(56) References Cited

U.S. PATENT DOCUMENTS

| | | |
|---|---|---|
| 2006/0114847 A1* | 6/2006 | Dssouli et al. .............. 370/261 |
| 2007/0041386 A1* | 2/2007 | Mar et al. ............... 370/395.52 |
| 2008/0104218 A1 | 5/2008 | Liang et al. |
| 2008/0107122 A1* | 5/2008 | Lai et al. ................... 370/401 |
| 2008/0109536 A1 | 5/2008 | Hong et al. |
| 2008/0170518 A1* | 7/2008 | Duggi et al. ................ 370/310 |
| 2008/0201403 A1 | 8/2008 | Andersson et al. |
| 2009/0157844 A1 | 6/2009 | Fionda et al. |
| 2009/0232034 A1* | 9/2009 | Li et al. ..................... 370/310 |
| 2009/0276540 A1* | 11/2009 | Ahn et al. ................... 709/243 |
| 2010/0083127 A1* | 4/2010 | Rofougaran ................. 715/740 |
| 2011/0047384 A1* | 2/2011 | Jacobs et al. ............... 713/176 |
| 2011/0113149 A1* | 5/2011 | Kaal ........................... 709/231 |

\* cited by examiner

TEMPORARY COLLABORATIVE AD-HOC NETWORK OF HARDWARE NODES TO PERFORM FUNCTION

BACKGROUND

With the advent of modern electronics, there exist distributed collections of devices, sensors, embedded systems, processors, and other types of what are referred to herein as hardware nodes. A hardware node may have an intrinsic reason for "being" just as to itself, such as to perform a given function. For example, a global positioning system (GPS) device can be considered a hardware node that performs GPS functionality such as mapping and routing.

SUMMARY OF THE INVENTION

A non-transitory computer-readable data storage medium of an embodiment of the invention stores computer-executable code executable by a given hardware node to perform a method. The method detects that a trigger for creating a temporary collaborative ad-hoc network of hardware nodes including the given hardware node has occurred. The method initiates creation of the temporary collaborative ad-hoc network of hardware nodes responsive to the trigger occurring, to result in creation of the temporary collaborative ad-hoc network of hardware nodes. The method includes participating in the temporary collaborative ad-hoc network of hardware nodes so that the temporary collaborative ad-hoc network of hardware nodes performs a given function.

A hardware node of an embodiment of the invention includes a hardware communication mechanism to communicate with one or more other hardware nodes. The hardware node includes first logic to detect that a trigger for creating a temporary collaborative ad-hoc network of hardware nodes including the other hardware nodes has occurred. The hardware node includes second logic to initiate creation of the temporary collaborative ad-hoc network of hardware nodes responsive to the trigger occurring via communicating with the other hardware nodes using the hardware communication mechanism, to result in creation of the temporary collaborative ad-hoc network of hardware nodes. The hardware node includes third logic to participate in the temporary collaborative ad-hoc network of hardware nodes so that the temporary collaborative ad-hoc network of hardware nodes performs a given function.

A system of an embodiment of the invention includes hardware nodes organizable as a temporary collaborative ad-hoc network. A first hardware node is to detect that a trigger for creating the temporary collaborative ad-hoc network has occurred. The hardware nodes are to create the temporary collaborative ad-hoc network via intercommunication among the hardware nodes responsive to the trigger occurring. After the temporary collaborative ad-hoc network has been created, the temporary collaborative ad-hoc network is to perform a given function.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, distributed collections of devices, sensors, embedded sensors, processors, and other types of hardware nodes exist that may each have an intrinsic reason for "being" just as to itself. However, having these hardware nodes cooperate with one another to perform a distributed function has proven to be significantly more difficult. For example, while a global positioning system (GPS) device can perform GPS functionality as to a given vehicle, combining such GPS functionality of multiple GPS devices of multiple vehicles can enable other, distributed functionality, such as tracking a convey of such vehicles as a single unit.

Existing prior art in this respect includes smart devices, such as mobile phones, laptops, and other types of hardware nodes, that have the requisite memory, processing capability, and communication capability to communicate with other nodes. However, such smart devices are not intrinsically able to cooperate with one another to perform a distributed function. Existing mesh networking technology, such as mesh networking technology available under the Bluetooth® trademark owned and registered by Bluetooth SIG, Inc., permits networks of nodes to be created, reconfigured, and destroyed dynamically without a central router or other controller. However, such existing mesh networking technology does not include the nodes cooperating with one another to perform a given function.

Other existing prior art includes Agilla middleware technology, which runs over wireless sensor networks so that nodes can communicate with one another to perform a function. However, this type of middleware technology does not provide for the nodes to know the nodes that are members of a network. As such, a given node cannot initiate a function to be performed by the network based on what types of nodes are present within the network, limiting the utility of this existing approach. Similarly, Gnutella peer-to-peer networking technology permits nodes to communicate with one another without a central controller, but because there is no definition as to the membership of the network, its utility is limited.

Still other existing prior art includes BitTorrent file-sharing technology. This technology does permit the membership of the network to be known. However, the membership is maintained by a central controller, commonly called a tracker system. As such, ad-hoc peer-to-peer networks cannot be created without such a central controller. The controller also acts as a single point of failure within the network, further limiting the robustness of this type of technology.

In light of the above approaches, embodiments of the invention permit a temporary ad-hoc network of heterogeneous or homogeneous hardware nodes to be created. Embodiments of the invention use prior art such as smart devices and mesh networking technology like that available under the Bluetooth® trademark as lower-level enabling technology on top of which embodiments of the invention can be implemented. The network is ad-hoc in the sense that it is a peer-to-peer network, which does not require a central controller to management membership. At the same time, however, each hardware node within the network has a list of the hardware nodes that are members of the network, to a degree of desired correctness.

As such, a given node can initiate a function to be performed by the network based on what types of nodes are present within the network. The network itself can be dynamically created, modified, and destroyed without the need for a central controller. Certain aspects of embodiments of the invention include how such a temporary collaborative network is created; how a hardware node performs roll call to update its understanding of the other nodes that are members of the network; and to what extent a hardware node has to have a correct understanding of which other nodes that are members of the network.

The description of embodiments of the invention that follows is organized in the following manner. First, methods describing how temporary ad-hoc collaborative networks are created, modified, and used are described. Second, illustrative examples of such networks are provided in a non-limiting manner, to convey a sense for the types of networks that can be created and used pursuant to embodiments of the invention. Third, representative nodes and systems are described to conclude the detailed description.

Figure 1:
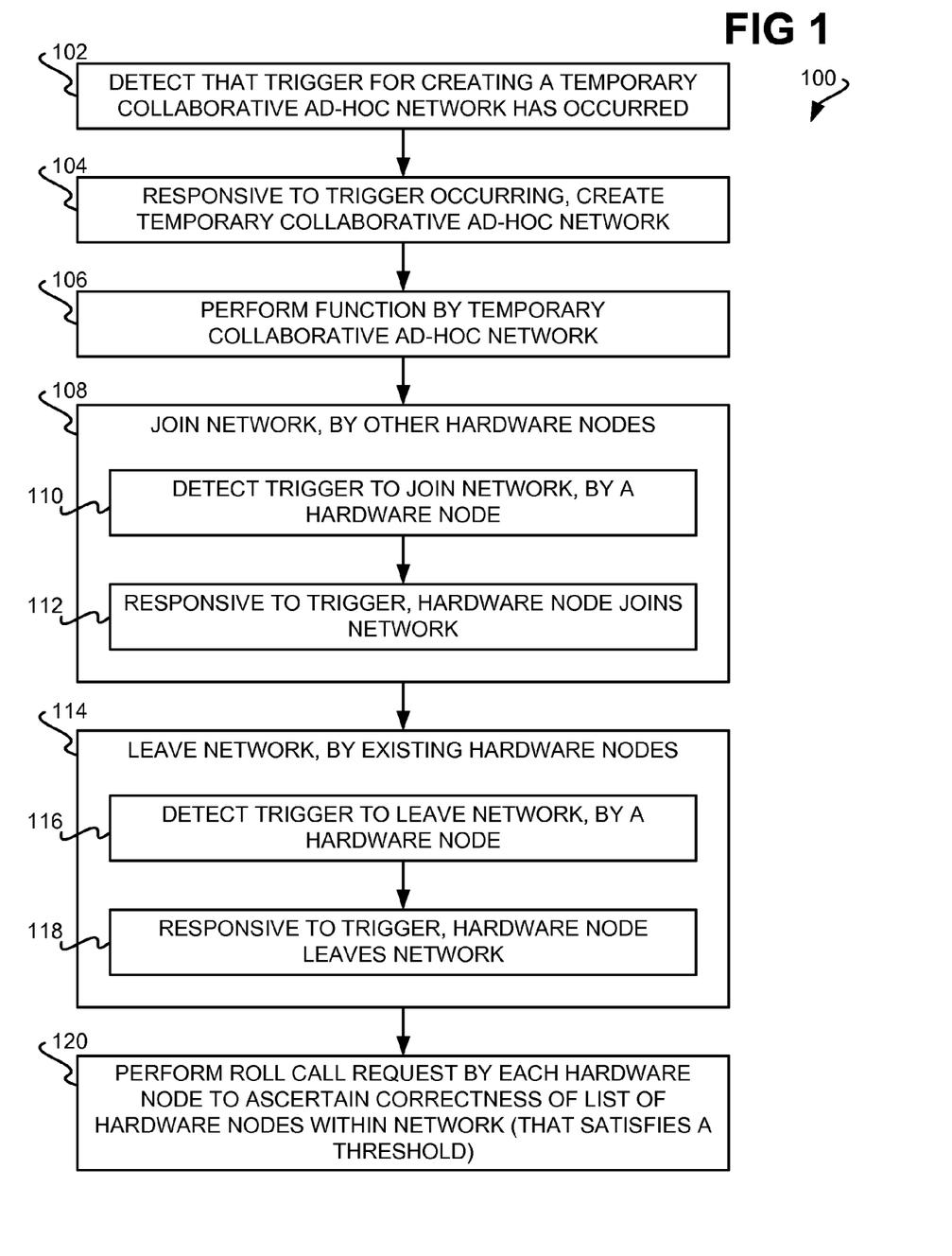
FIG. 1 is a flowchart of a method regarding a temporary collaborative ad-hoc network, according to an embodiment of the invention.

FIG. 1 shows a method 100, according to an embodiment of the invention. The method 100 is performed in relation to hardware nodes. Performance of the method 100 by a particular hardware node is also described in relation to FIG. 1. The hardware nodes can be heterogeneous or homogeneous. Examples of hardware nodes include sensors, embedded sensors, processors, and other types of hardware nodes, such as hardware devices like mobile phones, other types of mobile devices, computing devices like desktop and laptop computers, and so on.

That a trigger for creating a temporary collaborative ad-hoc network of the hardware nodes has occurred is detected (102). For instance, a particular hardware node may detect that such a trigger has occurred. Detecting that the trigger has occurred can include one or more of the following. First, a particular hardware node may determine that a given function is to be performed, such that the temporary collaborative ad-hoc network is to be created to perform this given function. In this case, the particular hardware node becomes a member of the network. Second, a particular hardware node may evaluate one or more predefined criteria, where evaluation of the predetermined criteria results in a determination that a temporary collaborative ad-hoc network is to be created, including the particular hardware node in question.

Third, a particular hardware node, or one or more of the hardware nodes, may determine that the hardware nodes are located within geographical vicinity of one another. For example, there may be three hardware nodes. The first hardware node may be able to communicate with just the second hardware node, and likewise the third hardware node may be able to communicate with just the second hardware node. As such, a mesh network can be created, where communication between the first and third nodes is achieved through the second node. In this case, all three nodes become founding hardware nodes of the temporary collaborative ad-hoc network. In this sense, geographical vicinity can be defined in that among the hardware nodes, each hardware node can communicate directly with every other node, or indirectly with every other node through one or more intermediate nodes.

Responsive to the trigger occurring, the temporary collaborative ad-hoc network of hardware nodes is created via intercommunication among the hardware nodes (104). For instance, a particular hardware node may initiate creation of the collaborative ad-hoc network of hardware nodes by communicating with other hardware nodes with which the particular hardware node can directly communicate. Each other hardware node then communicates with still other hardware nodes with which it can directly communicate but with which the particular hardware node cannot. This process is then repeated until all the desired hardware nodes have been included in the network.

Each hardware node maintains the following information: an identifier uniquely identifying the network that has been created; a list of the nodes that are members of the network; and the last time that the hardware node has updated this list. Each hardware node may further maintain metadata regarding the capabilities of each hardware node, and/or the functionality of the network itself. For example, since the hardware nodes may be heterogeneous, the types of different nodes may be maintained. Some hardware nodes may be sensors, other hardware nodes may contribute processing power, and so on. The functionality of the network can be the purpose for which the network was created, and thus can be associated with the trigger that resulted in the creation of the temporary collaborative ad-hoc network.

It is noted that the network is ad-hoc in that the network is a peer-to-peer network that does not require a central controller to coordinate the network or its membership. That is, each hardware node is a peer to every other hardware node, and no hardware node is considered as a master over any other node. The network is a collaborative network in that the hardware nodes work together to perform a function that no hardware node by itself can individually perform. The network is temporary in the sense that once the function in question has been performed, the network may be disbanded, although the network may be subsequently recreated if needed.

The function that the network performs, while potentially being associated with the trigger that resulted in the creation of the network, can further be cooperatively determined. For example, the network may have been created because a sufficient number of nodes of different types became collocated within the same geographical area. Once the network has been created, the nodes can together determine what function to perform, based on the types of nodes that are members of the network. Two or more nodes may want particular processing to be done, for instance, such that upon a sufficient number of nodes being members of the network that have relatively large amounts of processing power, this processing can then be performed.

In this respect, the function that the network performs does not have to be preordained prior to the creation of the network. That is, the function does not have to be associated with the trigger that resulted in creation of the network. The hardware nodes of the temporary collaborative ad-hoc network are able to work together on the basis of exchanging messages among one another. The network can thus be considered as being modeled after human interaction, as opposed to classical deterministic computing architectures. The network can further be considered as being modeled after swarms of organisms like bees, where there are different types of bees, and a swarm of bees performs a function in part based on which bees are currently present within the swarm.

After the temporary collaborative ad-hoc network of hardware nodes has been created, then, the network performs the function in question (106). Different tasks to complete the function may be assigned to different nodes by other nodes, or by the nodes volunteering to perform the tasks based on the capabilities that they have and their availability. In this way, because the nodes can be heterogeneous, functions that could not be performed by any given node can indeed be performed by the network of nodes as a whole. From the perspective of a particular hardware node within the network, this node participates in the temporary collaborative ad-hoc network of hardware nodes in part 106 so that the network performs the function in question.

At various times, other hardware nodes may join the network (108). For example, an additional hardware node may detect that a trigger for it to join the temporary collaborative ad-hoc network has occurred (110). In response, this additional node joins the network (112). Detecting that the trigger has occurred can include one or more of the following. First, the additional hardware node may determine that it has a capability that can assist in performing the function of the network. Second, the additional node may determine that it is within the geographical vicinity of the network. Third, the additional node may evaluate one or more predefined criteria, where evaluation of these criteria results in a determination that the additional node should join the network. Therefore, in some situations, just because a hardware node is geographically proximate to the network does not necessarily mean that the node will join the network.

To join the temporary collaborative ad-hoc network, the additional hardware node communicates with an existing hardware node of the network. The existing hardware node of the network adds the additional node to its list of the member nodes of the network, and this information is replicated throughout the network on a node-by-node basis by inter-node communication. The additional node receives the list of member nodes from the existing hardware node in question, as well as any other information that the existing node maintains regarding the network.

At various times, existing hardware nodes may further leave the network (114). For example, an existing hardware node may detect that a trigger for it to leave the temporary collaborative ad-hoc network has occurred (116). In response, the existing hardware node leaves the network (118). Detecting that the trigger has occurred can include one or more of the following. First, the existing hardware node may determine that its capabilities or no longer needed in performing the function of the network. Second, the existing hardware node may determine that it is no longer within the geographical vicinity of the network. Third, the existing node may evaluate one or more predefined criteria, where evaluation of these criteria results in a determination that the existing node should leave the network. Therefore, in some situations, an existing node may leave the network even though it still remains geographically proximate to the temporary collaborative ad-hoc network.

To leave the temporary collaborative ad-hoc network, the existing hardware node attempts to communicate with another existing hardware node of the network. This latter node removes the former node from its list of member nodes of the network, and this information is replicated throughout the network on a node-by-node basis by inter-node communication. If the existing hardware node is no longer geographically proximate to any other node within the network, however, it may not be able to communicate its intention of leaving the network. In such case, while the existing hardware node is no longer within the network, the other nodes do not realize this until they perform roll call, as is described later in the detailed description.

It is further noted in this respect that hardware nodes may drop out of the network at times, due to failures and other circumstances, such that the nodes cannot inform the other nodes within the network that they are leaving the network. Additionally, communication among the hardware nodes when a hardware node leaves or joins the network may not reach all the hardware nodes within the network. For example, communication interference may result in some hardware nodes not receiving communication that a new node has joined the network. In this respect, such inter-node communication is not intended to be guaranteed; rather, the network itself is intended to be sufficiently robust that it can compensate for these and other situations occurring.

Therefore, periodically each hardware node of the network may perform a roll call request (120). A hardware node performs a roll call request to one or more other hardware nodes to ascertain a list of the hardware nodes that are currently members of the network. By such periodic performance, each hardware node thus maintains an accurate list of the member hardware nodes of the temporary collaborative ad-hoc network.

However, this notion of roll call is tempered by the fact that it may be unnecessary for a given hardware node to have a completely correct list of hardware nodes that are currently members of the network. For example, a hardware node may desire for a given function to be performed by the network that requires two nodes of one type and three nodes of another type. Therefore, so long as the hardware node has learned that the network includes at least these five nodes, it may be unnecessary for the node to have a completely accurate list of the nodes that are in the network.

As such, performing the roll call request by a hardware node can include ascertaining a correctness of the list of the hardware nodes within the network that satisfies a threshold, such that the correctness of the list is not necessarily completely correct or accurate. The threshold is associated with one or more of the following. First, the threshold can be associated with the given function that is being performed by the network; so long as the correctness of the list is sufficient for the given function to be performed, greater (i.e., better or more accurate) correctness of the list is unnecessary.

Second, the threshold can be associated with the size of the network. The threshold may decrease as the size of the network, in terms of the number of nodes that are members of the network, increases. This ensures that the periodic performance of roll call by the hardware nodes does not overwhelm the available bandwidth for inter-node communication, and further does not result in the nodes spending most of their processing time answering roll call requests.

Similarly, third, the threshold can be associated with the amount of bandwidth available for the hardware nodes to communicate with one another. The threshold may decrease as the amount of bandwidth for inter-node communication decreases. This also ensures that the periodic performance of roll call by the hardware nodes does not overwhelm the available bandwidth for inter-node communication.

This concept of "good enough" accuracy in the list of member hardware nodes maintained by each hardware node thus advantageously leverages the core reason why maintaining such a list is useful, while minimizing some of the disadvantages associated with maintaining such a list. Having each hardware node maintain a membership list is useful because it permits each node to have a better sense of understanding of the membership of the network within the confines of a peer-to-peer network architecture. However, having each hardware node maintain a "good enough" membership list prevents the problems associated with having each hardware node maintain such a membership list, as described above.

In general, having roll call permits the network to compensate for obstacles such as memory coherence, race conditions, non-guaranteed communications, and dynamic membership within the network in a non-overly rigorous and computationally or communicatively expensive manner. Since individual network nodes as well as individual node-to-node communication are not perfectly reliable, having roll call overcomes these problems. At the same time, to prevent too much overhead in maintaining an accurate list of node membership within the network at each member node, the membership list has a configurably weighted correctness of the list on a per-node basis.

In one embodiment, the correctness that should be satisfied by the membership list maintained at each hardware node of the network may be part of the metadata stored at each network node and associated with the network as a whole. In another embodiment, however, the correctness may be specified independently by each node, either on the basis of this metadata, or not on the basis of this metadata. Ultimately, the correctness is desirably set to temper the needs for maintaining an accurate membership list at each node, with the overhead—both in terms of processing and communication—associated with such accurate list maintenance.

Figure 2:
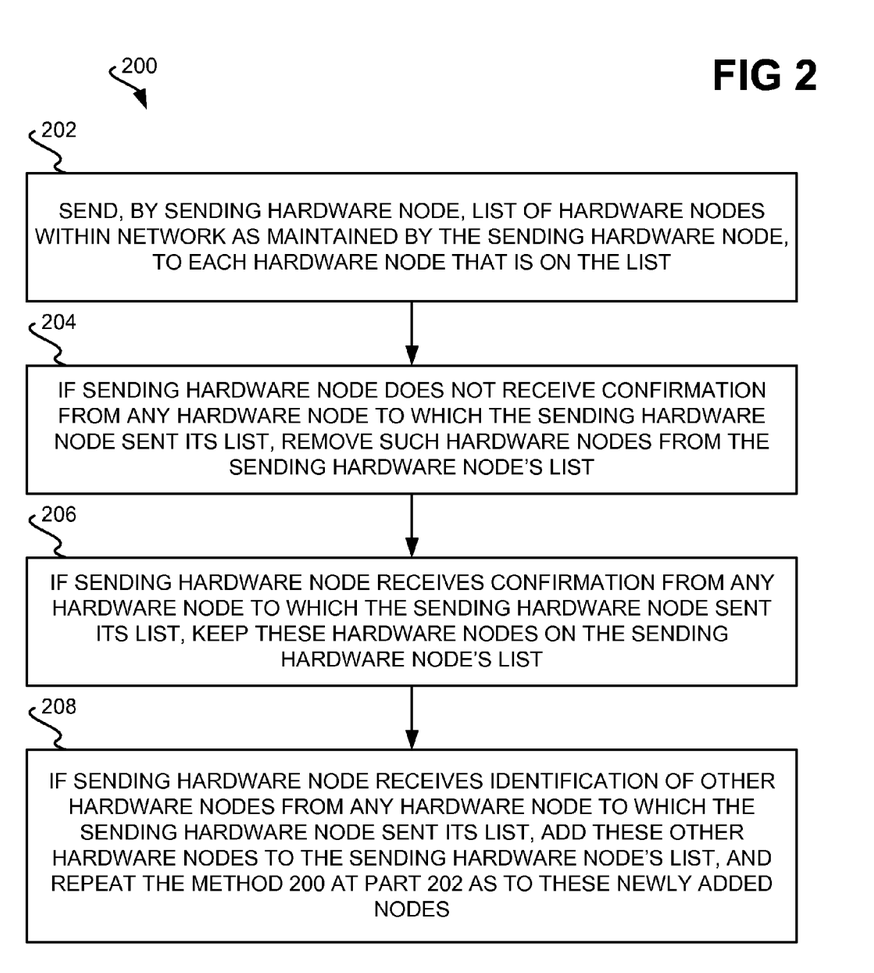
FIG. 2 is a flowchart of a method for performing roll call within a temporary collaborative ad-hoc network, from the perspective of a sending hardware node, according to an embodiment of the invention.

FIG. 2 shows a method 200 for performing roll call, from the perspective of a hardware node that is performing the roll call request, according to an embodiment of the invention. The hardware node performing the method 200 is referred to as the sending hardware node. The sending hardware node sends the list of hardware nodes within the network that the sending hardware node maintains to each hardware node that is on this list (202). If the sending hardware node does not receive confirmation from a particular hardware node to which the sending hardware node has sent the list, then the sending hardware node removes this particular node from its list of nodes within the temporary collaborative ad-hoc network (204).

By comparison, if the sending hardware node does receive confirmation from a particular hardware node to which the sending hardware node has sent the list, then the sending hardware node keeps this particular node on its list of nodes within the network (206). The sending hardware node may also receive from a particular hardware node to which the sending hardware node has sent its list identification of one or more other hardware nodes that are present on the particular hardware node's list of nodes within the network, but that are not present on the sending hardware node's list. In this case, the sending hardware node adds these other hardware nodes to its list of nodes within the network, and repeats the method 200 at part 202 as to these nodes that have been newly added to the sending hardware node's list (208).

As a rudimentary example, the sending hardware node may have four nodes in its list of nodes on the network, itself and three other nodes, the latter which are referred to herein as nodes A, B, and C. Node A may no longer be in the network, however. Therefore, responsive to the sending hardware node sending its list of nodes to node A, node A does not provide confirmation back to the sending hardware node that it is still within the network. As such, the sending hardware node removes node A from its list of nodes within the network.

Node B may still be in the network, and have three nodes in its list of nodes on the network, the sending hardware node, itself (i.e., node B), and node C. Therefore, responsive to the sending hardware node sending its list of nodes to node B, node B provides confirmation back to the sending hardware node that node B is still within the network. As such, the sending hardware node keeps node B on its list of nodes within the network. However, node B does not provide identification of any other nodes within the network that it is aware of but that the sending hardware node is not, since node B is not aware of any such nodes.

Node C may still be in the network, and have four nodes in its list of nodes on the network, the sending hardware node, itself (i.e., node C), node B, as well as an additional node referred to as node D. Therefore, responsive to the sending hardware node sending its list of nodes to node C, node C provides confirmation back to the sending hardware node that node C is still within the network, such that the sending hardware node keeps node C on its list. Furthermore, node C provides identification of node D, as a node that is on node C's list of nodes within the network but is not on the sending hardware node's list of nodes within the network. In response to receiving the identification of node D, the sending hardware node adds node D to its list of nodes within the network, and the sends its (updated) list of nodes within the network to node D, repeating the method 200 at part 202 with respect to node D.

Figure 3:
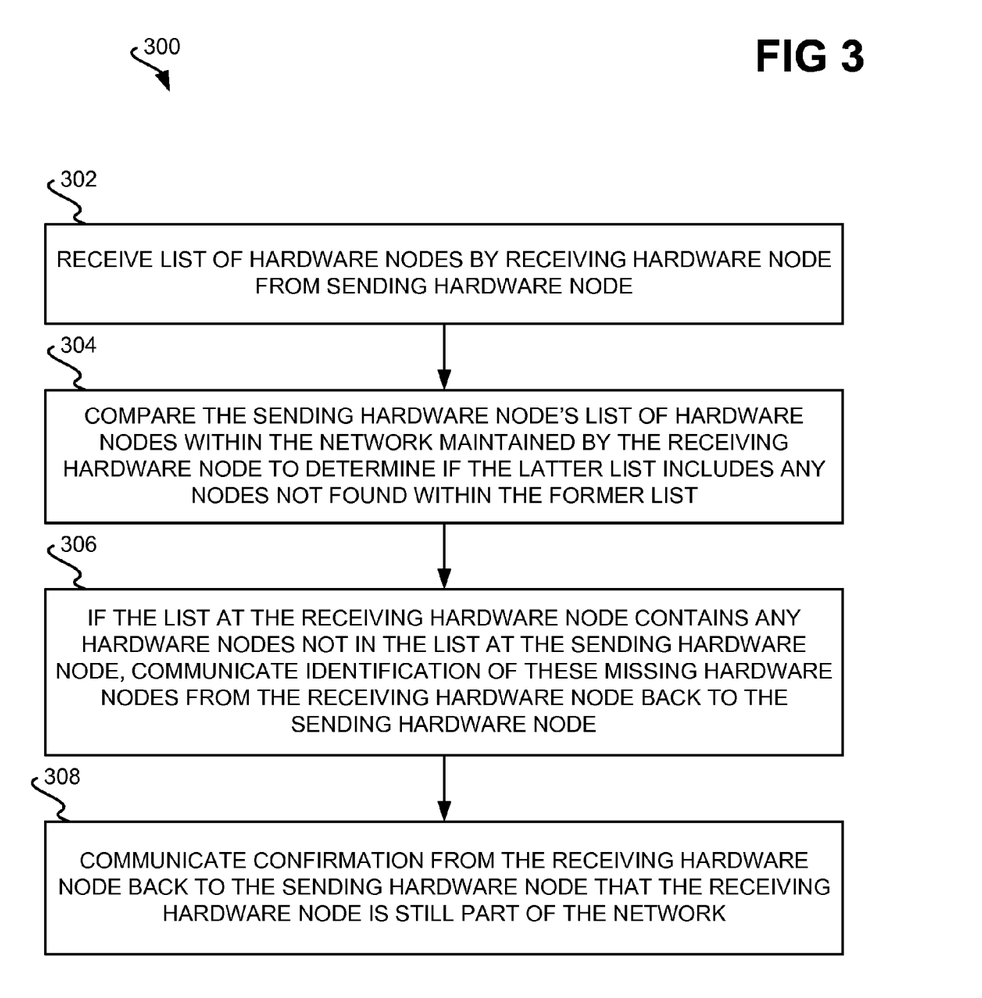
FIG. 3 is a flowchart of a method for performing roll call within a temporary collaborative ad-hoc network, from the perspective of a receiving hardware node, according to an embodiment of the invention.

FIG. 3 shows a method 300 for performing roll call, from the perspective of a hardware node that has received a list of nodes within the network from the sending hardware node pursuant to the method 200 of FIG. 2, according to an embodiment of the invention. The hardware node performing the method 300 is referred to as the receiving hardware node. The receiving hardware node thus receives a list of hardware nodes from the sending hardware node (302).

The receiving hardware node compares the sending hardware node's list to the list of hardware nodes within the network that the receiving hardware node itself maintains (304). The receiving hardware node performs this comparison to determine if there are any nodes listed in its list that are not listed in the sending hardware node's list that has been received. If any such nodes exist, then the receiving hardware node communicates the identification of these missing nodes back to the sending hardware node (306). Regardless of whether any such nodes do or do not exist, however, the receiving hardware node does communication a confirmation back to the sending hardware node that the receiving hardware node is still part of the network (308).

The foregoing methods provide for the creation of a temporary collaborative ad-hoc network to perform a function. Two examples are now provided to give a sense of how these techniques can be used to provide functionality that no individual hardware node can itself perform. In a first example, the hardware nodes are various Internet-browsing hardware devices that are currently being used by corresponding users to browse a particular electronic commerce Internet web site.

Some hardware devices may be mobile phones, others may be other types of mobile devices, and still others may be laptop or desktop computers. Another hardware device is a server computing device that is hosting the web site in question.

These hardware nodes communicate with one another to determine that a group discount for a particular item being offered for sale on the web site can be procured. In response, the hardware devices that are currently browsing the web site form a temporary collaborative ad-hoc network together with the server computing device hosting the web site. Each hardware device asks its user if the user is interested in purchasing the item in question; alternatively, the hardware device may already have this information available. Hardware devices that do not have users that are interested in purchasing the item may not initially join the network, or may leave the network once it is determined that their users are not interested in purchasing the item.

The remaining hardware devices within the network collaboratively work together with the server computing device hosting the web site to purchase the item from the web site in question. The server computing device may count the number of the other hardware nodes on the network, to determine the per-user price of the item taking into account the group discount. Each hardware device may then communicate with the server computing device, automatically, the billing and shipping information of its corresponding user. As such, the users of the hardware devices are able to purchase the item at a discounted price, even though no user (and thus no hardware device of any user) knows the billing and shipping information of any other user. Rather, this information is conveyed solely to the server computing device hosting the web site.

As another example, the hardware nodes may include traffic signals located on roads, speed sensors on roads that detect the speeds at which vehicles are traveling on roads, and the vehicles themselves. When a traffic signal determines that a sufficient number of vehicles are traveling on a corresponding road, it may initiate the creation of a temporary collaborative ad-hoc network with at least the other traffic signals and the speed sensors on this road. The function of the network is to time the traffic signals, based on the speeds at which the vehicles are traveling on the road, so that traffic flow of the vehicles is optimized.

Furthermore, the network may also include the vehicles themselves, in addition to or in lieu of the speed sensors. In this instance, the function of the network may be to optimize traffic flow of the vehicles by adjusting both the timing of the traffic signals, as well as the speed of the vehicles. The vehicles may automatically control the speeds at which they are traveling in this respect, with user approval. Alternatively, the vehicles may instruct their operators to slow down or to speed up so that traffic flow is optimized. As vehicles leave or enter the roadway, they may join or leave the network. If there are less than a predetermined number of vehicles on the roadway, the network itself may be disbanded.

Figure 4:
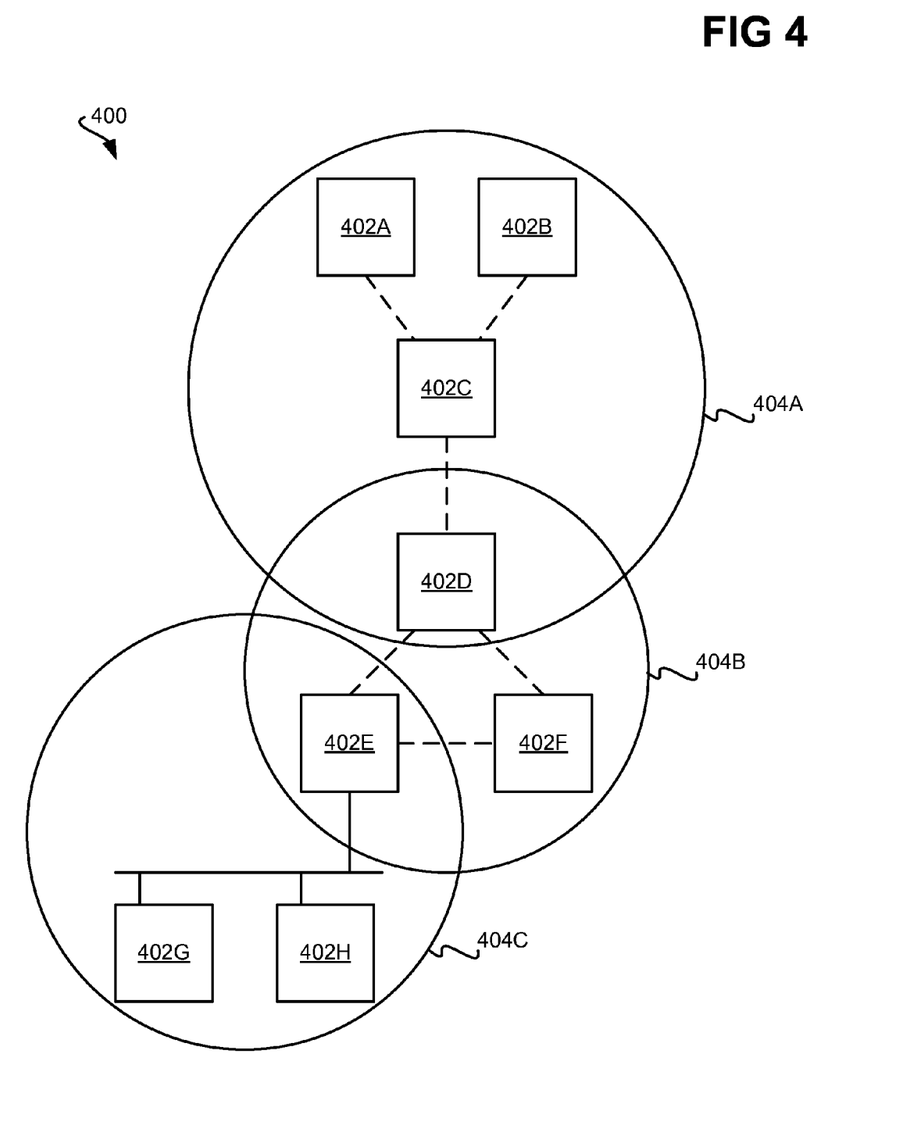
FIG. 4 is a diagram of a system of hardware nodes that can be organized as a temporary collaborative ad-hoc network, according to an embodiment of the invention.

FIG. 4 shows a representative system 400, according to an embodiment of the invention. The system 400 includes eight hardware nodes 402A, 402B, . . . , 402H, collectively referred to as the hardware nodes 402. The hardware nodes 402 can be of similar, identical, or different types. The system 400 includes three types of network topologies, identified as sub-networks 404A, 404B, and 404C, which are collectively referred to as the sub-networks 404.

The sub-network 404A operates as a mesh wireless networking topology, such as that identified by the Bluetooth® trademark. The sub-network 404A includes hardware nodes 402A, 402B, 402C, and 402D. The hardware node 402C can communicate directly with all the other nodes 402A, 402B, and 402D within the sub-network 404A. By comparison, the hardware nodes 402A, 402B, and 402D can each just communicate directly with the node 402C. Therefore, for the hardware node 402A to communicate with the hardware node 402B, for example, such communication passes through the hardware node 402C.

The hardware node 402D is also part of the sub-network 404B, which operates as a non-mesh wireless networking topology, such as that identified by the Wi-Fi® trademark that is owned and registered by the Wi-Fi Alliance, or such as a 3G, 4G, or other type of mobile phone networking topology. The sub-network 404B also includes the hardware nodes 402E and 402F. In conjunction with a non-mesh wireless networking topology, each hardware node 402D, 402E, and 402F can directly communicate with each other hardware node 402D, 402E, and 402F within the sub-network 404B. For either hardware node 402E or 402F to communicate with either hardware node 402A, 402B, or 402C, such communication passes at least through the hardware node 402D, and also through the hardware node 402C with respect to communication with the hardware node 402A or 402B.

The hardware node 402E is also part of the sub-network 404C, which is a operates as a wired networking topology, such as an Ethernet network. The sub-network 404C also includes the hardware nodes 402G and 402H. In conjunction with a wired networking topology, each hardware node 402E, 402G, and 402H can directly communicate with each other hardware node 402E, 402G, and 402H within the sub-network 404C. For either hardware node 402G or 402H to communicate with hardware node 402D, 402E, or 402F, such communication passes through the hardware node 402E. For either hardware node 402G or 402H to communicate with hardware node 402A, 402B, or 402C, such communication passes at least through the hardware nodes 402E and 402D, and also through the hardware node 402C with respect to communication with the hardware node 402A or 402B.

A temporary collaborative ad-hoc network can be established among the nodes 402 of the system 400 pursuant to the methods 100, 200, and 300 of FIGS. 1, 2, and 3, respectively, as follows. With respect to just the sub-network 404A, at least the hardware node 402C has to be part of the network, since otherwise the hardware nodes 402A, 402B, and 402D cannot communicate with one another. With respect to just the sub-network 404B, two or more of the hardware nodes 402D, 402E, and 402F can be part of the network. Likewise, with respect to just the sub-network 404C, two or more of the hardware nodes 402E, 402G, and 402H can be part of the network.

If the hardware nodes 402 of both the sub-networks 404A and 404B are to be part of the network, then the hardware node 402D has to be part of the network, since the node 402D permits the nodes 402 within the sub-network 404A to communicate with the nodes 402 within the sub-network 404B, and vice-versa. Furthermore, if either hardware node 402A or 402B is to be part of this network, then the hardware node 402C also has to be part of the network, since the nodes 402A and 402B can communicate with the node 402D just through the node 402C. If the hardware nodes 402 of the both the sub-networks 404B and 404C are to be part of the network, then the hardware node 402E has to be part of the network, since the node 402E permits the nodes 402 within the sub-network 404B to communicate with the nodes 402 within the sub-network 404C.

If the hardware nodes 402 of both the sub-networks 404A and 404C are to be part of the network, then the hardware nodes 402D and 402E have to be part of the network, to bridge the sub-networks 404A and 404C. Finally, if the hardware nodes 402 of all three sub-networks 404 are to be part of the network, then the hardware nodes 402D and 402E have to be part of the network, to again bridge the sub-networks 404A and 404C. As before, in either case, if either hardware node 402A or 402B is to be part of this network, then the hardware node 402C also has to be part of the network, since the nodes 402A and 402B can communicate with the node 402D just through the node 402C.

Therefore, FIG. 4 illustrates that embodiments of the invention can employ existing networking topologies as enabling technology. These networking topologies themselves are contrasted with embodiments of the invention in that none of these topologies themselves provide for a temporary collaborative ad-hoc network that can be established and maintained pursuant to the methods 100, 200, and 300 of FIGS. 1, 2, and 3, as described above. Rather, insofar as hardware nodes have to be able to communicate with one another to create a temporary collaborative ad-hoc network and for the network to perform a given function, such communication can be achieved by existing networking topologies, as well as other networking topologies.

Figure 5:
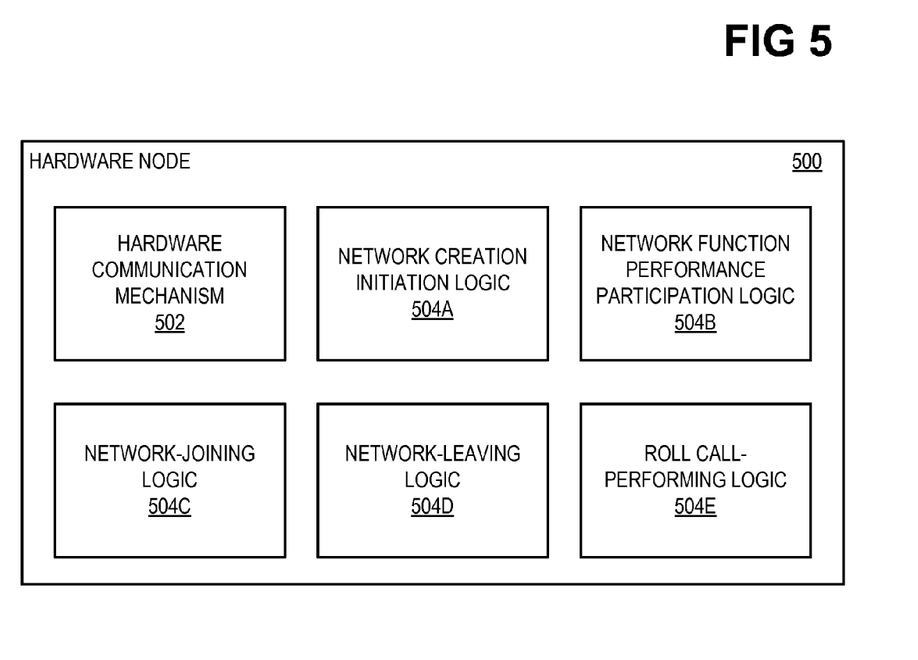
FIG. 5 is a diagram of a hardware node that can be a part of a temporary collaborative ad-hoc network, according to an embodiment of the invention.

In conclusion, FIG. 5 shows a rudimentary hardware node 500, according to an embodiment of the invention. The hardware node 500 can implement any of the nodes 402 that have been described in relation to FIG. 4, for instance. The hardware node 500 includes a hardware communication mechanism 502, as well as five types of logic 504A, 504B, . . . , 504E, collectively referred to as the logic 504. Each of the logic 504 can be implemented directly in hardware, or as software that is stored on a non-transitory computer-readable data storage medium and that is then executed by a processor of the hardware node 500, where such a processor is not depicted in FIG. 5.

The hardware communication mechanism 502 includes the hardware necessary to perform node-to-node communication in accordance with one or more networking topologies. Such networking topologies can include wired as well as wireless networking topologies, examples of which have been provided above. The logic 504A is a network creation initiation logic that performs parts 102 and 104 of the method 100 of FIG. 1 in relation to the hardware node 500. The logic 504B is a network function performance participation logic that performs part 106 of the method 100 in relation to the hardware node 500. The logic 504C is a networking-joining logic that performs parts 110 and 112 of the method 100, whereas the logic 504D is a network-leaving logic that performs parts 116 and 118 of the method 100. The logic 504E is a roll call-performing logic that performs part 120 of the method 100, such as by performing the method 200 of FIG. 2 and/or the method 300 of FIG. 3.

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A non-transitory computer-readable data storage medium storing computer-executable code executable by a given hardware node to perform a method comprising:
    detecting that a trigger for creating a temporary collaborative ad-hoc network of hardware nodes including the given hardware node has occurred;
    initiating creation of the temporary collaborative ad-hoc network of hardware nodes responsive to the trigger occurring, to result in creation of the temporary collaborative ad-hoc network of hardware nodes; and,
    participating in the temporary collaborative ad-hoc network of hardware nodes so that the temporary collaborative ad-hoc network of hardware nodes performs a given function associated with the trigger that resulted in the creation of the temporary collaborative ad-hoc network of hardware nodes,
    wherein the hardware nodes comprise a plurality of different functional types of hardware nodes, each different functional type associated with a different functionality,
    wherein the given function associated with the trigger comprises a function that uses the different functionality of each different functional type of the hardware nodes and that cannot be performed by any of the hardware nodes individually,
    wherein the trigger comprises a number of a particular type of at least some of the nodes being greater than a predetermined static number greater than two, the given function being associated with having the number of the particular type of the at least some of the nodes being greater than the predetermined static number,
    and wherein the given function cannot be performed unless the number of the particular type of the at least some of the nodes is greater than the predetermined static number.

2. The non-transitory computer-readable data storage medium of claim 1 wherein the method further comprises performing a roll call request so that the given hardware node ascertains a list of the hardware nodes within the temporary collaborative ad-hoc network.

3. The non-transitory computer-readable data storage medium of claim 2, wherein performing the roll call request comprises ascertaining a correctness of the list of the hardware nodes within the temporary collaborative ad-hoc network that satisfies a threshold, such that the correctness of the list of the hardware nodes is not necessarily completely correct.

4. A hardware node comprising:
    a hardware communication mechanism to communicate with one or more other hardware nodes;
    first logic to detect that a trigger for creating a temporary collaborative ad-hoc network of hardware nodes including the other hardware nodes has occurred, and to initiate creation of the temporary collaborative ad-hoc network of hardware nodes responsive to the trigger occurring via communicating with the other hardware nodes using the hardware communication mechanism, to result in creation of the temporary collaborative ad-hoc network of hardware nodes; and,
    second logic to participate in the temporary collaborative ad-hoc network of hardware nodes so that the temporary collaborative ad-hoc network of hardware nodes performs a given function associated with the trigger that resulted in the creation of the temporary collaborative ad-hoc network of hardware nodes,
    wherein the hardware nodes comprise a plurality of different functional types of hardware nodes, each different functional type associated with a different functionality,
    wherein the given function associated with the trigger comprises a function that uses the different functionality of each different functional type of the hardware nodes and that cannot be performed by any of the hardware nodes individually,
    wherein the trigger comprises a number of a particular type of at least some of the nodes being greater than a predetermined static number greater than two, the given function being associated with having the number of the particular type of the at least some of the nodes being greater than the predetermined static number, and wherein the given function cannot be performed unless the number of the particular type of the at least some of the nodes is greater than the predetermined static number.

5. The hardware node of claim 4, further comprising third logic to ascertain a list of the hardware nodes within the temporary collaborative ad-hoc network.

6. The hardware node of claim 5, wherein the third logic is to ascertain a correctness of the list of the hardware nodes within the temporary collaborative ad-hoc network that satisfies a threshold, such that the correctness of the list of the hardware nodes is not necessarily completely correct.

7. A system comprising:
a plurality of hardware nodes organizable as a temporary collaborative ad-hoc network,
wherein a first hardware node of the plurality of hardware nodes is to detect that a trigger for creating the temporary collaborative ad-hoc network has occurred,
wherein the hardware nodes are to create the temporary collaborative ad-hoc network via intercommunication among the hardware nodes responsive to the trigger occurring, and
wherein after the temporary collaborative ad-hoc network has been created, the temporary collaborative ad-hoc network is to perform a given function associated with the trigger that resulted in creation of the temporary collaborative ad-hoc network,
wherein the hardware nodes comprise a plurality of different functional types of hardware nodes, each different functional type associated with a different functionality,
wherein the given function associated with the trigger comprises a function that uses the different functionality of each different functional type of the hardware nodes and that cannot be performed by any of the hardware nodes individually,
wherein the trigger comprises a number of a particular type of at least some of the nodes being greater than a predetermined static number greater than two, the given function being associated with having the number of the particular type of the at least some of the nodes being greater than the predetermined static number,
and wherein the given function cannot be performed unless the number of the particular type of the at least some of the nodes is greater than the predetermined static number.

8. The system of claim 7, wherein a second hardware node of the plurality of hardware nodes is to perform a roll call request so that the second hardware node ascertains a list of the hardware nodes within the temporary collaborative ad-hoc network,
and wherein the second hardware node is to ascertain a correctness of the list of the hardware nodes within the temporary collaborative ad-hoc network that satisfies a threshold, such that the correctness of the list of the hardware nodes is not necessarily completely correct.

* * * * *